US010167352B1

(12) United States Patent
Dimitrov et al.

(10) Patent No.: US 10,167,352 B1
(45) Date of Patent: *Jan. 1, 2019

(54) POLYMERIZATION INITIATING SYSTEM AND METHOD TO PRODUCE HIGHLY REACTIVE OLEFIN FUNCTIONAL POLYMERS

(71) Applicants: University of Massachusetts, Boston, MA (US); Infineum International Limited, Abingdon, Oxfordshire (GB)

(72) Inventors: Philip Dimitrov, Jersey City, NJ (US); Richard J. Severt, North Plainfield, NJ (US); Thomas Skourlis, Basking Ridge, NJ (US); Jeremy Weber, Brooklyn, NY (US); Jacob Emert, Brooklyn, NY (US); Rudolf Faust, Lexington, MA (US)

(73) Assignees: University of Massachusetts, Boston, MA (US); Infineum International Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,460

(22) Filed: Jun. 28, 2017

(51) Int. Cl.
*C08F 110/10* (2006.01)
*C08F 4/14* (2006.01)

(52) U.S. Cl.
CPC .............. *C08F 110/10* (2013.01); *C08F 4/14* (2013.01)

(58) Field of Classification Search
CPC .. C08F 110/10; C08F 4/14; C08F 4/16; C08F 24/22; C08F 2500/02; C08F 2500/03; C08F 2500/04
USPC .................. 526/90, 210, 237, 348, 348.7
See application file for complete search history.

(56) References Cited

U.S. PATENT DOCUMENTS

| | | | |
|---|---|---|---|
| 2,682,531 | A | 6/1954 | Ernst et al. |
| 3,846,392 | A | 11/1974 | Matsumara et al. |
| 3,850,897 | A | 11/1974 | Priola et al. |
| 5,254,649 | A | 10/1993 | Miln et al. |
| 5,408,018 | A | 4/1995 | Rath |
| 5,663,470 | A | 9/1997 | Chen et al. |
| 5,710,225 | A | 1/1998 | Johnson et al. |
| 5,789,335 | A | 8/1998 | Chen et al. |
| 6,211,312 | B1 | 4/2001 | Holtcamp |
| 6,346,585 | B1 | 2/2002 | Johnson et al. |
| 6,407,170 | B1 | 6/2002 | Johnson et al. |
| 6,407,186 | B1 | 6/2002 | Rath et al. |
| 6,441,110 | B1 | 8/2002 | Sigwart et al. |
| 6,562,913 | B1 | 5/2003 | Baxter, Jr. et al. |
| 6,683,138 | B2 | 1/2004 | Baxter, Jr. et al. |
| 6,753,389 | B1 | 6/2004 | Rath et al. |
| 6,846,903 | B2 | 1/2005 | Wettling et al. |
| 6,939,943 | B2 | 9/2005 | Wettling et al. |
| 7,038,008 | B2 | 5/2006 | Wettling et al. |
| 7,217,773 | B2 | 5/2007 | Rath et al. |
| 7,291,758 | B2 | 11/2007 | Bohnenpoll et al. |
| 7,683,194 | B2 | 3/2010 | Krossing et al. |
| 8,349,977 | B2 | 1/2013 | Koenig et al. |
| 8,637,619 | B2 | 1/2014 | Koenig et al. |
| 8,697,820 | B2 | 1/2014 | Koenig et al. |
| 9,034,998 | B2 | 5/2015 | Faust et al. |
| 9,156,924 | B2 | 10/2015 | Faust et al. |
| 9,631,038 | B2 | 4/2017 | Faust et al. |
| 9,771,442 | B2 | 9/2017 | Faust et al. |
| 9,771,554 | B2 | 9/2017 | Faust et al. |
| 2004/0059076 | A1 | 3/2004 | Webb et al. |
| 2008/0293900 | A1 | 11/2008 | Hanefeld et al. |
| 2009/0318624 | A1 | 12/2009 | Storey et al. |
| 2011/0201772 | A1 | 8/2011 | Koenig et al. |
| 2012/0165473 | A1 | 6/2012 | Koenig et al. |
| 2013/0158217 | A1 | 6/2013 | Faust et al. |
| 2014/0275453 | A1 | 9/2014 | Emert et al. |
| 2015/0105525 | A1 | 4/2015 | Faust et al. |
| 2016/0333123 | A1 | 11/2016 | Faust et al. |

FOREIGN PATENT DOCUMENTS

| | | |
|---|---|---|
| CN | 1753918 A | 3/2006 |
| CN | 101613423 B | 12/2009 |
| CN | 101955558 * | 1/2011 |
| CN | 102007149 A | 4/2011 |
| CN | 102046671 A | 5/2011 |
| CN | 102137875 A | 7/2011 |
| EP | 0 436 775 | 7/1991 |
| EP | 0 489 508 | 6/1992 |
| EP | 2 604 635 | 6/2013 |

(Continued)

OTHER PUBLICATIONS

International Search Report and Written Opinion for Int'l Appl. No. PCT/US2012/069822, entitled: "Polymerization Initiating System and Method to Produce Highly Reactive Olefin Functional Polymers," dated Mar. 21, 2013.
Kennedy et al., "New Telechelic Polymers and Sequential Copolymers by Polyfunctional Initiator-Transfer Agents (Inifers)," *Polymer Bulletin* (1), pp. 575-580 (1979).
Liu et al., "A cost-effective process for highly reactive polyisobutylenes via cationic polymerization coinitiated by AlCl3," *Polymer* (51), pp. 5960-5969 (2010).
Morgan et al., "Sulfonium Ion Adducts from Quasiliving Polyisobutylene and Mono- or Disulfides," *Macromolecules* (42), pp. 2344-2352 (2009).
Nielsen et al., "Synthesis of Isobutenyl-telechelic polyisobutylene by functionalization with isobutenyltrimethylsilane," *Polymer* (38)(No. 10), pp. 2529-2534 (1997).

(Continued)

*Primary Examiner* — William K Cheung
(74) *Attorney, Agent, or Firm* — Hamilton, Brook, Smith & Reynolds, P.C.

(57) ABSTRACT

A method for producing highly reactive olefin polymers wherein at least 50 mol. % of the polymer chains have terminal double bonds, from an impurity-containing isobutylene or a mixed $C_4$ hydrocarbyl feedstock containing isobutylene in which the water content of the feedstock is controlled to be at least equal to the content of polar impurities in the feedstock, and less than the concentration at which the water causes a decrease in vinylidene endgroup selectivity.

17 Claims, No Drawings

(56) References Cited

FOREIGN PATENT DOCUMENTS

| EP | 2 860 206 A1 | 4/2015 |
|----|----|----|
| JP | 3-203917 B2 | 6/1995 |
| JP | 48-60784 | 1/2012 |
| WO | WO 94/19380 | 9/1994 |
| WO | WO 99/07753 | 2/1999 |
| WO | WO 2002/048216 A2 | 6/2002 |
| WO | WO 2004/014968 A2 | 2/2004 |
| WO | WO 2004/058828 | 7/2004 |
| WO | WO 2006/074211 | 7/2006 |
| WO | WO 2008/095933 | 8/2008 |
| WO | WO 2009/120551 | 10/2009 |
| WO | WO 2010/008890 A2 | 1/2010 |
| WO | WO 2010/139684 | 12/2010 |
| WO | WO 2011/054785 | 5/2011 |
| WO | WO 2013/021058 A1 | 2/2013 |
| WO | WO 2013/090764 | 6/2013 |

OTHER PUBLICATIONS

Simison et al., "End-Quenching of Quasiliving Carbocationic Isobutylene Polymerization with Hindered Bases: Quantitative Formation of exo-Olefin-Terminated Polyisobutylene," *Macromolecules* (39), pp. 2481-2487 (2006).

Vasilenko et al., "Cationic Polymerization of Isobutylenc Using AlC13Bu2 as a Coinitiator: Synthesis of Highly Reactive Polyisobutylene," *Macromolecules* (43), pp. 5503-5507 (2010).

European Search Report for European Application No. 11194680. 2-1301, entitled: "Polymerization Initiating System and Method to Produce Highly Reactive Olefin Functional Polymers," dated Mar. 22, 2013.

Shiman, D.I. et al., "Cationic Polymerization of Isobutylene by AlC13/ether Complexes in Non-Polar Solvents: Effect of Ether Structure on the Selectivity of β-H Elimination," Polymer, 54: 2235-2242 (2013).

Kostjuk, S.V., "Recent Progress in the Lewis Acid Co-Initiated Cationic Polymerization of Isobutylene and 1,3-dienes," Royal Society of Chemistry, 5(17): 13125-13144 (Jan. 2015).

Kumar, R., et al., "Synthesis of Highly Reactive Polyisobutylene With FeC13/Ether Complexes in Hexane; Kinetic and Mechanistic Studies," Polymer Chemistry, 6(2): 322-329 (Jan. 2015).

Bartelson, K.J., et al., "Cationic Polymerization of Isobutylene by FeC13/Ether Complexes in Hexanes: An Investigation of the Steric and Electronic Effects of Ethers," Polymer, 54(18): 4858-4863 (Jul. 2013).

International Preliminary Report on Patentability for PCTUS2012/ 069822, entitled: "Polymerization Initiating System and Method to Produce Highly Reactive Olefin Functional Polymers," dated Jun. 26, 2014.

European Search Report for European Application No. 14157689.2, entitled: "Polymerization Initiating System and Method to Produce Highly Reactive Olefin Functional Polymers," dated May 15, 2014.

Chinese Office Action and Search Report for Patent Application 201280069469.X dated Oct. 10, 2015, "Polymerization Initiating System and Method to Produce Highly Reactive Olefin Functional Polymers,".

Chinese Office Action and Search Report for Patent Application 2014100878340 dated Dec. 3, 2015, "Polymerization Initiating System and Method to Produce Highly Reactive Olefin Functional Polymers,".

Japanese Office Action for Patent Application 20144547502 dated Feb. 19, 2016, "Polymerization Initiating System and Method to Produce Highly Reactive Olefin Functional Polymers,".

Chinese Office Action for Patent Application 2014105327556 Filed Oct. 10; 2014, "Polymerization Initiating System and Method to Produce Highly Reactive Olefin Functional Polymers," dated Jun. 28, 2016.

European Search Report for EP Application No. 16165673.1; dated Oct. 17, 2016.

Non-Final Office Action for U.S. Appl. No. 13/328,569; dated Mar. 20, 2013.

Final Office Action for U.S. Appl. No. 13/328,569; dated Jan. 3, 2014.

Non-Final Office Action for U.S. Appl. No. 13/796,405; dated Jan. 30, 2014.

Non-Final Office Action for U.S. Appl. No. 13/328,569, dated Jul. 9, 2014.

Non-Final Office Action for U.S. Appl. No. 13/796,405, dated Aug. 21, 2014.

Notice of Allowance for U.S. Appl. No. 13/328,569; dated Jan. 30, 2015.

Non-Final Office Action for U.S. Appl. No. 14/052,490, dated Feb. 13, 2015.

Notice of Allowance dated Jul. 7, 2015 for U.S. Appl. No. 13/796,405; entitled "Polymerization Initiating System and Method to Produce Highly Reactive Olefin Functional Polymers".

Final Office Action for U.S. Appl. No. 14/052,490, dated Sep. 28, 2015.

Office Action for U.S. Appl. No. 14/052,490, dated Mar. 31, 2016.

Notice of Allowance dated Aug. 31, 2016 for U.S. Appl. No. 14/052,490 entitled "Polymerization Initiating System and Method to Produce Highly Reactive Olefin Functional Polymers".

Notice of Allowance dated Dec. 22, 2016 for U.S. Appl. No. 14/052,490 entitled "Polymerization Initiating System and Method to Produce Highly Reactive Olefin Functional Polymers".

Office Action for U.S. Appl. No. 14/710,763, dated Oct. 20, 2016.

Chinese Office Action for Patent Application 2014105327556 Filed Oct. 10, 2014, "Polymerization Initiating System and Method to Produce Highly Reactive Olefin Functional Polymers," dated Mar. 2, 2017.

Notice of Allowance dated Jun. 15, 2017 for U.S. Appl. No. 14/710,763, entitled "Polymerization Initiating System and Method to Produce Highly Reactive Olefin Functional Polymers".

European Office Action for 14187668.0 Filed Oct. 3, 2014, "Polymerization Initiating System and Method to Produce Highly Reactive Olefin Functional Polymers," dated Jun. 8, 2017.

European Office Action for 14157689.2 Filed Mar. 4, 2014, "Polymerization Initiating System and Method to Produce Highly Reactive Olefin Functional Polymers," dated Jun. 7, 2017.

Chinese Office Action for Patent Application 2014105327556, filed Oct. 10, 2014, entitled, "Polymerization Initiating System and Method to Produce Highly Reactive Olefin Functional Polymers," dated Mar. 13, 2018.

Canadian Office Action for Patent Application 2,859,545 filed Dec. 14, 2012, entitled, "Polymerization Initiating System and Method to Produce Highly Reactive Olefin Functional Polymers," dated Dec. 8, 2017.

Canadian Notice of Allowance for Patent Application 2,859,545 filed Dec. 14, 2012, entitled, "Polymerization Initiating System and Method to Produce Highly Reactive Olefin Functional Polymers," dated May 22, 2018.

Chinese Notice of Allowance for Patent Application 2014105327556, filed Oct. 10, 2014, entitled, "Polymerization Initiating System and Method to Produce Highly Reactive Olefin Functional Polymers," dated Jul. 2, 2018.

Japanese Office Action for Patent Application 2014-208290, filed Oct. 10, 2014, entitled, "Polymerization Initiating System and Method to Produce Highly Reactive Olefin Functional Polymers," dated Jun. 18, 2018.

Japanese Notice of Allowance for Patent Application 2014-046191, filed Mar. 10, 2014, entitled, "Polymerization Initiation System and Method for Producing Highly Reactive Olefin Functional Polymer," dated Jan. 23, 2018.

* cited by examiner

POLYMERIZATION INITIATING SYSTEM AND METHOD TO PRODUCE HIGHLY REACTIVE OLEFIN FUNCTIONAL POLYMERS

The invention is directed to a method for producing highly reactive olefin polymers wherein at least 50 mol. % of the polymer chains have terminal double bonds, from an impurity-containing isobutylene or a mixed $C_4$ hydrocarbyl feedstock containing isobutylene.

BACKGROUND OF THE INVENTION

Catalyst systems for cationic polymerization of isobutylene (IB) or $C_4$ streams containing isobutylene (IB) (e.g. Raffinate 1) that can produce olefinic polymers of Mn=500-3000 with a reactive vinylidene at the terminus (HR-PIB) are of high commercial value. Catalysts based on $BF_3$ complexes with alcohols or ethers have been used commercially, but they generally require low temperature and highly purified feed (U.S. Pat. No. 7,411,104 B2). Lewis acid-Lewis base complexes of aluminum halides or alkyl aluminum halides and ethers have also been disclosed in a range of media and with a variety of co-initiators. The initiators are primarily alkyl halides, $H_2O$, HCl or ROH (e.g. Macromolecules 2010, 43(13), pp 5503-5507, Polymer 2010, 51, pp 5960-5969).

Getting high monomer conversions and high vinylidene in an apolar medium (suitable for commercial scale-up) using a continuous process without elaborate feed clean-up has been elusive. Catalysts that work well in a polar medium such as dichloromethane, often do not work in an apolar saturated hydrocarbon medium (Macromolecules, 2012, 45, pp 3318-3325).

One of the advances highlighted recently is that ethers with one or more electron-withdrawing groups (e.g. bis-2-chloro-ethyl ether, CEE) were particularly useful in enabling alkyl aluminum dichloride to initiate cationic polymerization in the presence of t-butyl chloride as co-initiator giving a high yield of HR-PIB (U.S. Pat. No. 9,156,924 B2). In the absence of the electron withdrawing groups, dialkyl ethers inhibited polymerization in an apolar medium (*Macromolecules,* 2014, 47 (6), pp 1959-1965) either because the Lewis acid-Lewis base complexes were too strong (high binding energy) or the resulting t-butyl oxonium ions were too stable. This made the rate of polymerization too slow to be commercially viable.

Even with complexes of the appropriate binding energy, small amounts of polar impurities such as acetone or methanol have been found to impede or inhibit polymerization. For example, only 30 ppm of acetone slows down the polymerization of IB drastically in the presence of 2000 ppm of $EtAlCl_2$.CEE complex. Other polar impurities that can inhibit IB polymerization include higher alcohols, ketones, ethers, acetonitrile and carboxylic acids such as propionic acid. The total amount of polar feed impurities in many commercial feedstocks can be from 5 to about 200 ppm.

Surprisingly, applicants have found that the presence of a small amount of water surprisingly ameliorates the negative effect on polymerizations carried out using $alkylAlCl_2$. CEE as catalyst and alkyl halide as initiator caused by a range of polar impurities commonly present in IB, and IB-containing feed streams. The present method enables lower cost processes that can use a broader range of feedstocks without expensive feed clean-up equipment. Though water itself can normally act as co-initiator for the polymerization of IB (US 2016/0333123 A1), the presence of alkyl halide as co-initiator is necessary to control the reaction and get reasonable monomer conversions with impure feed streams. The amount of water is also critical. Typically when water is used as a co-initiator for IB polymerizations it is generally present at concentrations of 5-100, e.g 10-50 mM (US 2016/0333123 A1). However, in the presence of alkyl halide, this amount of water can cause a decrease in vinylidene end-group selectivity. On the other hand, too little water does not eliminate the inhibiting effect of polar impurities on polymerization completely, especially if the molar concentration of water is lower than the concentration of impurities in the feed stream.

DETAILED DESCRIPTION OF THE INVENTION

Lewis acids useful in the practice of the present invention include Lewis acids of the formula $R'AlCl_2$, wherein R' is a hydrocarbyl group, preferably a hydrocarbyl group having 1 to 12 carbon atoms, more preferably an alkyl group having 1 to 12 carbons. As used herein, the term "hydrocarbyl" means a chemical group of a compound that contains hydrogen and carbon atoms and that are bonded to the remainder of the compound directly via a carbon atom. The group may contain one or more atoms other than carbon and hydrogen ("hetero atoms"), provided such hetero atoms do not affect the essentially hydrocarbyl nature of the group.

Useful Lewis bases are dihydrocarbyl ethers wherein each hydrocarbyl group is independently selected from hydrocarbyl groups having 1 to 8 carbon atoms. The hydrocarbyl groups of the ether may be branched, straight-chained or cyclic. Where the hydrocarbyl groups of the ether are branched or straight-chained, the hydrocarbyl groups are preferably alkyl groups, more preferably alkyl groups having 1 to 4 carbon atoms. One or both hydrocarbyl groups of the dihydrocarbyl ether are substituted with an electron withdrawing group, particularly a halogen atom, preferably a chlorine atom.

The Lewis acid and Lewis base can be complexed by, for example, by dissolving the Lewis acid in a solvent selected from liquid, apolar, non-halogenated aliphatics, and liquid aromatics, such as benzene, chlorobenzene, toluene and xylene, to form a solution and then adding the Lewis base to the solution, while the solution is stirred. The complex may be added to the polymerization medium with the solvent; alternatively, the solvent may be removed prior to the addition of the complex to the polymerization medium. Preferably, the solvent is a non-halogenated aliphatic or aromatic solvent, and is more preferably xylene or toluene, most preferably toluene. When the Lewis acid and Lewis Base are complexed in xylene or toluene, it is preferable to dissolve the Lewis base in the xylene or toluene solvent to form a solution, and then add the Lewis acid to the Lewis base solution, while the solution is stirred.

The molar ratio of Lewis acid to Lewis base in the complex will typically be maintained within a range of from about 1:1 to about 1:8, preferably from about 1:1 to about 1:6, more preferably from about 1:1 to about 1:3, such as about 1:1 to about 1:2 (e.g. about 1:1.5).

An "initiator" is defined as a compound that can initiate polymerization, in the presence or absence of adventitious water and in the presence of a proton trap. The initiator of the present invention (RX) comprises a hydrocarbyl R group, preferably an alkyl or aryl-alkyl group, wherein the carbon linking group R to X is tertiary, benzylic or allylic, preferably tertiary, which hydrocarbyl group can form a stable carbocation (e.g., t-butyl$^+$); and an X group, which is a halide, preferably chlorine.

The polymerization medium must be a substantially or completely apolar polymerization medium, such as a mixture of saturated and unsaturated $C_4$ hydrocarbons.

In the polymerization process of the present invention, the feedstock may be pure isobutylene or a mixed $C_4$ hydrocarbyl feedstock containing isobutylene, such as a $C_4$ cut resulting from the thermal or catalytic cracking operation of, for example, naphtha. Thus, suitable feedstocks will typically contain at least 10%, and up to 100% isobutylene, by mass (e.g. 20-50%, based on the total mass of the feed. In addition to isobutylene, conventional $C_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-$C_4$ polymerizable olefin monomers in minor amounts, e.g., typically less than 10%, preferably less than about 5%, and most preferably less than 1%, such as propadiene, propylene and $C_5$ olefins. In accordance with the present invention, the feedstock is not purified to remove polar impurities and will contain total amount of polar feed impurities such as acetone, methanol, acetonitrile, propionic acid and such of greater than or equal to 5 ppm, such as from about 5 to 500 ppm or from about 5 to about 200 ppm.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight ($\overline{M}_n$).

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 0.2 mM to about 200 mM, such as from about 1 mM to about 200 mM, preferably from about 5 mM to about 100 mM, and more preferably from about 10 mM to about 50 mM, such as about 10 mM to about 30 mM per liter of feedstock.

The initiator will typically be employed in an amount sufficient to contact the butene monomer in a liquid phase reaction mixture at a concentration of millimoles of initiator per liter of medium, and independent from the amount of Lewis acid-Lewis base complex, of from about 1 mM to about 200 mM, preferably from about 5 mM to about 100 mM, and more preferably from about 10 mM to about 50 mM, such as about 10 mM to about 30 mM per liter of feedstock.

Water can be added at different stages of the process. It can be added with the catalyst, the initiator or the monomer itself. The presence of a small amount of aromatic solvent such as toluene can facilitate the addition of water due to the increased solubility of water in that medium relative to an all aliphatic medium. Too much toluene, however, can result in unwanted side reactions. The total amount of toluene in the final medium is preferably 0 to about 20%, more preferably, 0 to about 15%, such as 0 to about 10%. A guard bed containing molecular sieves or $CaCl_2$ to dry the feed prior to the reaction can be useful to ensure that the proper amount of water is added to the reaction. The molar concentration of water present/added to the feedstock should be at least equal to the total molar concentration of polar impurities in the feedstock, more preferably, at least two times, such as at least three times, up to about ten times, such as up to about eight times, the molar concentration of polar impurities in the feedstock. The molar composition of water present/added to the feedstock should be less than the molar concentration that causes a decrease in vinylidene end-group selectivity, such as less than 10 mM, preferably less than 5 mM. More specifically, assuming a total amount of polar impurities of from about 5 to 200 ppm, the amount of water present/added to the feedstock is preferably from about 0.05 mM to less than 5 mM, preferably from about 0.1 mM to about 3 mM, more preferably from about 0.2 to about 2 mM, such as from about 0.3 mM to about 1 mM per liter of feedstock.

The polymerization reaction can be performed as a batch or continuous process. On an industrial scale, the polymerization reaction is preferably conducted continuously. The continuous process can be carried out in tubular reactors, tube-bundle reactors or loop reactors, or tube or tube-bundle reactors with continuous circulation of the reaction material, or in a stirred tank reactor (glass, carbon steel or Monel preferred).

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane and isobutane.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form together with the Lewis acid-Lewis base complex or, preferably, is introduced to the monomer feed or the reaction mixture in liquid form by a line separate from the Lewis acid-Lewis base complex addition line.

The liquid phase reaction mixture temperature is controlled by conventional means to be typically from about −30° C. to about +50° C., preferably from about −10° C. to about +30° C., more preferably from about −5° C. to about +20° C., such as about 0° C. to about +15° C. to minimize refrigeration costs and unwanted side reactions.

In order to insure even distribution of the catalyst within the reactor, turbulent flow of the reactor contents (Reynolds number>100, preferably >1000) can be generated by mixing, or with suitable baffles, such as baffle plates or oscillating baffles, or by dimensioning the reactor tube cross sections so that a suitable flow velocity is established.

The steady state residence time of the butene to be polymerized may be from about 1 to about 300 minutes, such as 2 to about 120 minutes, preferably from about 4 to about 60 minutes or from about 5 to about 45 minutes (e.g., from about 6 to about 30 minutes).

The process of the present invention is typically conducted in a manner achieving an isobutylene conversion in the range of from about 20% up to about 100%, preferably from about 50% to about 100%, and more preferably from about 70% to about 100%, such as 80% to 100%, 90% to 100% or 95% to 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetra-substituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. % based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

In one commercially preferred embodiment (from a standpoint of performance, environmental impact and cost), the Lewis acid is R'AlCl$_2$, wherein R' is $C_1$ to $C_4$ hydrocarbyl, specifically, MeAlCl$_2$, EtAlCl$_2$ (EADC), iso-BuAlCl$_2$ or n-BuAlCl$_2$, the Lewis base is a chlorinated dihydrocarbyl ether (CEE), the solvent is ISOPAR or toluene, and the complex is formed by dissolving the Lewis base in the solvent to form a solution and then adding the Lewis acid to the Lewis base solution in an amount such that the molar ratio of Lewis acid to Lewis base in the complex is from about 1:1 to about 1:1.5.

This invention will be further understood by reference to the following examples, which are not intended, and should not be construed as listing all possible embodiments within the scope of the invention.

EXAMPLES

Example 1 (Batch Polymerization Reaction)

EADC.CEE complexes were prepared just before polymerization of IB. In a glovebox, the required amount of ether was added to EADC in hexanes and stirred to form a Lewis acid/ether complex, followed by the addition of required amount of hexanes to make the fully soluble 0.1 M complexes. Polymerizations were performed under a dry $N_2$ atmosphere in an MBraun glovebox (MBraun, Inc. Stratham, N.H.). Typically, the required amount of hexanes was placed in the polymerization reactors, screw top culture tubes (75 mL), at −30° C. Then, the initiator (t-BuCl) was added to the reactors. IB was condensed and distributed to the polymerization reactors containing t-BuCl and hexanes. The polymerizations were started by adding EADC.CEE complex to the reactors at the polymerization temperature and terminated with either ammonium hydroxide (NH$_4$OH) or methanol. Resulting polymer was analyzed as described in *Macromolecules,* 2014, 47 (6), pp 1959-1965.

Example 2 (Continuous Polymerization Process)

EADC.CEE complexes were prepared in a glovebox. The required amount of ether was added to EADC in hexanes/toluene and stirred to form a soluble Lewis acid/ether complex. The concentration of EADC in the final catalyst solution was 7% by weight. A solution of t-BuCl (initiator) in toluene pre-saturated with water was also prepared in the glovebox at a concentration of 1.2% by weight. The monomer solution contained isobutylene in cyclohexane at 42% by weight.

The monomer solution was passed through an activated alumina dryer column, premixed continuously with the initiator solution and injected together with the catalyst complex solution in a Continuously Stirred Tank Reactor (CSTR). Mixing in the reactor was provided by a rotating impeller which operated at 1000 rpm. The CSTR was immersed in a cooling bath to control the temperature. The pressure in the reactor was maintained at 50 psig to keep the reaction solution in the liquid state. The reaction mixture was quenched continuously by mixing the reactor effluent with a mixture of isopropanol and water at a composition of 80% isopropanol and 20% water by weight. Monomer conversion was calculated via Gas Chromatography by comparing isobutylene composition before and after the reactor, and the resulting polymer was analyzed as in Example 1.

Using toluene saturated with water to prepare the initiator solution, an EADC concentration of 0.18% by weight in the reaction mixture, a [CEE]/[EADC] molar ratio of 2, a [t-BuCl]/[EADC] molar ratio of 1, and a reaction temperature of 4° C., an isobutylene conversion of 84% was maintained at an average residence time of 20 min., and the resulting polymer had an exo content of 86% and Mn of 2300.

TABLE 1

Polymerization of [IB] = 1.0M using [EADC•CEE] = 0.01M, [t-BuCl] = 0.01M and [propionic acid] = 0.3 mM, in hexanes at 0° C. with [CEE]/[EADC] = 1.5.

| [H$_2$O] (MM) | Conv$^a$ (%) | M$_{n,NMR}$$^b$ (g/mol) | M$_{n,SEC}$$^c$ (g/mol) | PDI$^c$ | Exo$^d$ (%) | Tri+ Endo$^d$ (%) | Tetra$^d$ (%) |
|---|---|---|---|---|---|---|---|
| 0.3 | <10 | | | | | | |
| 1.0 | 95 | 1200 | 1400 | 3.8 | 90 | 05 | 05 |
| 2.0 | 100 | 1000 | 1100 | 3.8 | 86 | 08 | 06 |
| 3.0 | 100 | 1000 | 900 | 3.5 | 87 | 07 | 06 |

$^a$Determined gravimetrically based on monomer feed;
$^b$Determined from NMR analysis;
$^c$Obtained from SEC measurements;
$^d$Calculated from $^1$H NMR spectroscopic study.

TABLE 2

Polymerization of [IB] = 1.0M using [EADC•CEE] = 0.01M, [t-BuCl] = 0.01M and [acetone] = 0.3 mM, in hexanes at 0° C. with [CEE]/[EADC] = 1.5.

| [H$_2$O] (MM) | Conv$^a$ (%) | M$_{n,NMR}^b$ (g/mol) | M$_{n,SEC}^c$ (g/mol) | PDI$^c$ | Exo$^d$ (%) | Tri+ Endo$^d$ (%) | Tetra$^d$ (%) |
|---|---|---|---|---|---|---|---|
| 0.3 | <10 | | | | | | |
| 1.0 | 81 | 1700 | 1900 | 2.8 | 88 | 06 | 06 |
| 2.0 | 100 | 1400 | 1600 | 3.4 | 82 | 10 | 08 |
| 3.0 | 100 | 1300 | 1200 | 2.9 | 77 | 13 | 10 |

$^a$Determined gravimetrically based on monomer feed;
$^b$Determined from NMR analysis;
$^c$Obtained from SEC measurements;
$^d$Calculated from $^1$H NMR spectroscopic study.

TABLE 3

Polymerization of [IB] = 1.0M using [EADC•CEE] = 0.01M, [t-BuCl] = 0.01M and [t-butanol] = 0.3 mM, in hexanes at 0° C. with [CEE]/[EADC] = 1.5.

| [H$_2$O] (MM) | Conv$^a$ (%) | M$_{n,NMR}^b$ (g/mol) | M$_{n,SEC}^c$ (g/mol) | PDI$^c$ | Exo$^d$ (%) | Tri+ Endo$^d$ (%) | Tetra$^d$ (%) |
|---|---|---|---|---|---|---|---|
| 0.3 | <10 | | | | | | |
| 1.0 | 100 | 900 | 1000 | 2.9 | 84 | 10 | 06 |
| 2.0 | 100 | 1000 | 1000 | 3.2 | 78 | 12 | 10 |
| 3.0 | 100 | 900 | 900 | 3.6 | 79 | 11 | 10 |

$^a$Determined gravimetrically based on monomer feed;
$^b$Determined from NMR analysis;
$^c$Obtained from SEC measurements;
$^d$Calculated from $^1$H NMR spectroscopic study.

TABLE 4

Polymerization of [IB] = 1.0M using [EADC•CEE] = 0.01M, [t-BuCl] = 0.01M and [acetonitrile] = 0.3 mM, in hexanes at 0° C. with [CEE]/[EADC] = 1.5.

| [H$_2$O] (MM) | Conv$^a$ (%) | M$_{n,NMR}^b$ (g/mol) | M$_{n,SEC}^c$ (g/mol) | PDI$^c$ | Exo$^d$ (%) | Tri+ Endo$^d$ (%) | Tetra$^d$ (%) |
|---|---|---|---|---|---|---|---|
| 0.3 | <10 | | | | | | |
| 1.0 | 30 | 1900 | 1800 | 3.3 | 86 | 08 | 06 |
| 2.0 | 100 | 1000 | 1000 | 3.2 | 87 | 07 | 06 |
| 3.0 | 100 | 1100 | 1000 | 3.8 | 89 | 07 | 04 |

$^a$Determined gravimetrically based on monomer feed;
$^b$Determined from NMR analysis;
$^c$Obtained from SEC measurements;
$^d$Calculated from $^1$H NMR spectroscopic study.

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

What is claimed is:

1. A process for the preparation of polybutene having an exo-olefin content of at least 50 mol. % from an impure isobutene or an isobutene-containing monomer feedstock containing from about 5 ppm to about 500 ppm of polar impurities, which process comprises contacting said impure isobutene or isobutene-containing feedstock, with a Lewis acid catalyst complexed with a Lewis base, in a substantially or completely apolar polymerization medium, and initiating polymerization of said isobutene or isobutene-containing feedstock with an initiator, wherein said Lewis acid catalyst is a Lewis acid of the formula R'AlCl$_2$, wherein R' is a hydrocarbyl group; said Lewis base is a dihydrocarbyl ether wherein each hydrocarbyl group is independently selected from hydrocarbyl groups having 1 to 8 carbon atoms and one or both hydrocarbyl groups of the dihydrocarbyl ether are substituted with an electron withdrawing group and the initiator is a compound of the formula RX, wherein X is a halide; R is a hydrocarbyl group capable of forming a stable carbocation, and wherein the carbon linking group R to group X is tertiary, benzylic or allylic; wherein the amount of water in said feedstock is controlled to be between an amount at least equal to the molar amount of polar impurities in said feedstock, and less than 5 mM per liter of feedstock.

2. The process of claim 1, wherein R' is an alkyl group having 1 to 12 carbons.

3. The process of claim 1, wherein said Lewis base is dihydrocarbyl ether wherein each hydrocarbyl group is independently selected from hydrocarbyl groups having 1 to 8 carbon atoms and one or both hydrocarbyl groups of the dihydrocarbyl ether are substituted with a chlorine atom.

4. The process of claim 3, wherein said Lewis base is dihydrocarbyl ether wherein each hydrocarbyl group is independently selected from alkyl groups having 1 to 4 carbon atoms and one or both hydrocarbyl groups of the dihydrocarbyl ether are substituted with a chlorine atom.

5. The process of claim 1, wherein the Lewis acid and Lewis base are complexed in a solvent selected from a liquid, apolar, non-halogenated aliphatic solvent or a liquid, aromatic solvent.

6. The process of claim 5, wherein said solvent is hexane, toluene or xylene.

7. The process of claim 1, wherein said apolar polymerization medium is selected from saturated C$_4$ hydrocarbons, unsaturated C$_4$ hydrocarbons, and mixtures thereof.

8. The process of claim 1, wherein said isobutene or isobutene-containing feedstock is selected from pure isobutene; a C$_4$ refinery cut containing between about 20-50% isobutene, between 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the C$_4$ refinery cut; and mixtures of pure isobutene and said C$_4$ refinery cut.

9. The process of claim 1, wherein said isobutene or isobutene-containing feedstock contains from about 5 ppm to about 200 ppm of polar impurities.

10. The process of claim 1, wherein the amount of water in said feedstock is controlled to be an amount between an amount at least equal to two times the molar amount polar of impurities in said feedstock, and less than 5 mM per liter of feedstock.

11. The process of claim 10, wherein said amount of water in said feedstock is controlled to be an amount between an amount at least equal to three times the amount polar impurities in said feedstock, and less than 5 mM per liter of feedstock.

12. The process of claim 1, wherein the amount of water in said feedstock is controlled to be an amount of from about 0.05 mM to less than 5 mM per liter of feedstock.

13. The process of claim 12, wherein the amount of water in said feedstock is controlled to be an amount of from about 0.2 to about 2 mM per liter of feedstock.

14. The process of claim 1, wherein said complex is contacted with said isobutene or isobutene-containing feedstock at a concentration of millimoles of Lewis acid-Lewis base complex per liter of feedstock of from about 0.2 mM to about 200 mM.

15. The process of claim 1, wherein the polymerization process is conducted continuously.

16. The process of claim 1, wherein said polybutene product has an exo-olefin content of at least 70 mol. %.

17. The process of claim 1, wherein said polybutene product has a number average molecular weight ($M_n$) of from about 400 Daltons to about 4000 Daltons.

\* \* \* \* \*